Jan. 23, 1968  R. D. RUMSEY  3,365,188
BUFFER WITH HYDRODYNAMIC PISTON CENTERING BEARING
Filed Oct. 21, 1965  2 Sheets-Sheet 1

INVENTOR.
ROLLIN DOUGLAS RUMSEY

ATTORNEYS

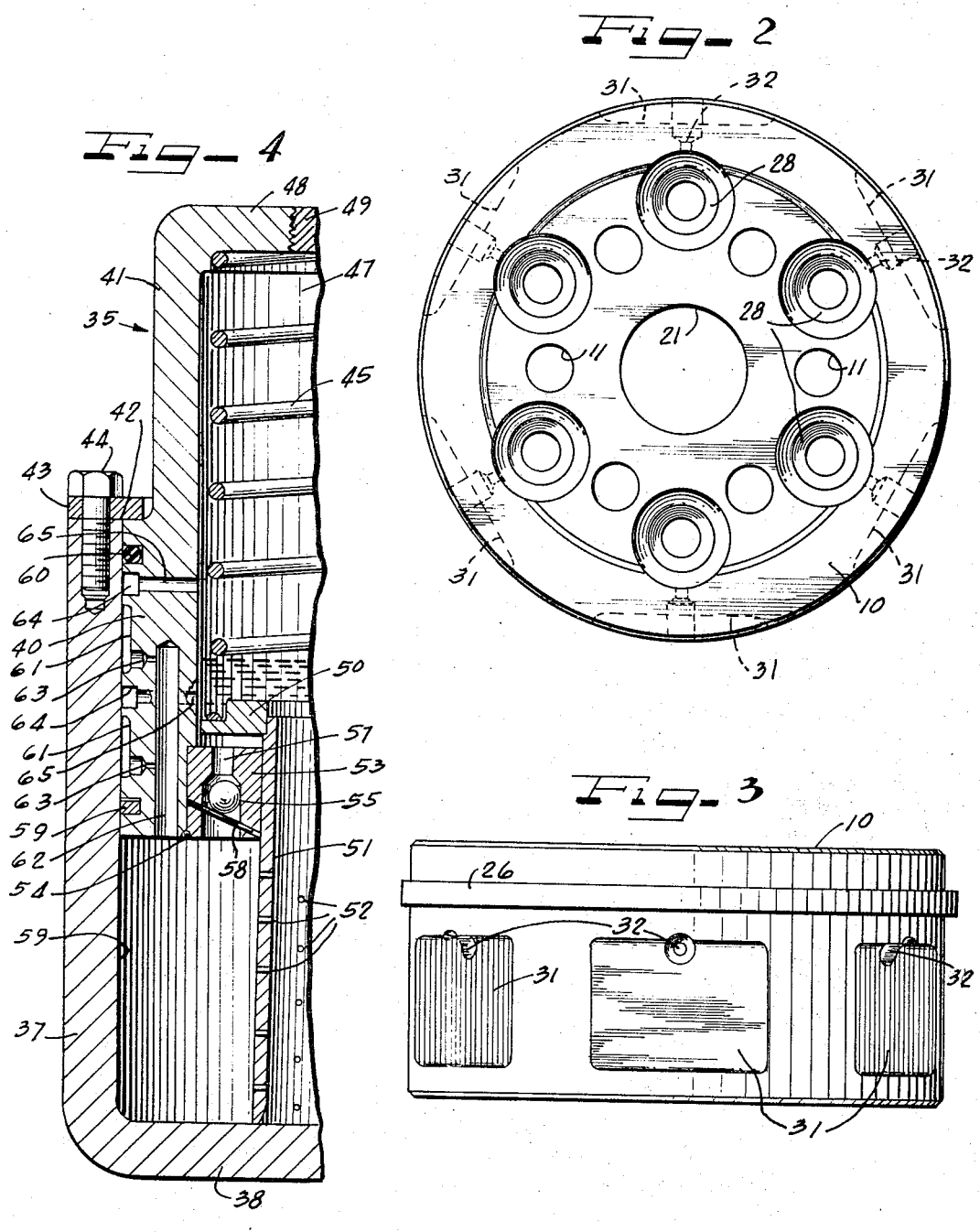

United States Patent Office 3,365,188
Patented Jan. 23, 1968

3,365,188
BUFFER WITH HYDRODYNAMIC PISTON
CENTERING BEARING
Rollin Douglas Rumsey, Buffalo, N.Y., assignor to
Houdaille Industries, Inc., Buffalo, N.Y., a corporation of Michigan
Filed Oct. 21, 1965, Ser. No. 500,068
12 Claims. (Cl. 267—1)

This invention relates to improvements in hydraulic buffers, and more particularly concerns a practical solution for the problem of hydraulic unbalance in piston operation under high hydraulic pressures.

It has been found, particularly in the operation of hydraulic pressure buffers, wherein opposing loading occurs on the two ends of the buffer and acts to close it, that frequently because of column instability the piston rod does not drive smoothly concentrically into the buffer housing. In highly loaded buffers such, for example, as may operate under hydraulic pressures of about 10,000 to 30,000 p.s.i., severe galling has occurred between the cylinder and the piston, all out of proportion to the eccentric loads imposed. This appears to be due to hydraulic unbalance caused by the hydraulic fluid completely squeezing out of the area of unbalanced pressure contact between the piston and the cylinder wall, whereas the hydraulic fluid at the opposite side of the piston, where a slight gap prevails, exerts a rather high force on the piston compounding the unbalance so that the substantially unlubricated relative sliding motion in such area results in galling.

A principal object of the present invention is to overcome the problem referred to in a simple, direct manner utilizing the working pressures generated in operation and avoiding the need for any additional bearings or the addition of any other parts to the assembly.

Another object is to provide a self-regulating system in which piston centering action of the hydraulic fluid functions throughout the range of pressures generated in operation of the buffer.

A further object of the invention is to provide new and improved hydrodynamic balancing means for centering a piston in a cylinder under high pressure operating conditions.

Other objects, features and advantages of the present invention will be apparent from the following detailed description of certain preferred embodiments thereof, taken in conjunction with the accompanying drawings, in which:

FIGURE 2 is a head end elevational view of the piston of the buffer of FIGURE 1;

FIGURE 3 is a side elevational view of the piston of FIGURE 2; and

FIGURE 4 is a fragmentary longitudinal sectional view through a modified buffer construction embodying features of the invention.

Figure 1:
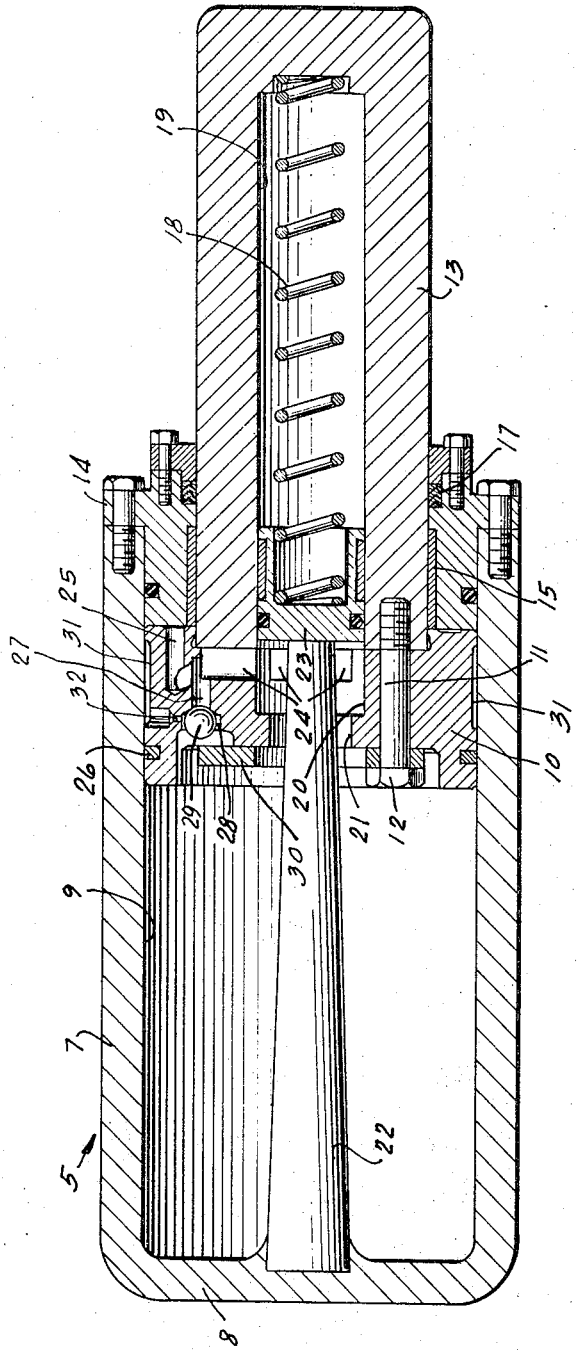
FIGURE 1 is a longitudinal sectional view through a buffer embodying features of the invention.

On reference to FIGURE 1, a hydraulic buffer 5 is shown which is of the side mounted type, that is which is adapted to be mounted in a generally horizontal position between two opposed structures or members which move toward one another with such force and velocity as to require the use of a buffer. One end of the buffer 5 is provided by a hollow cylinder 7 having a closed end 8 and defining a cylindrical working chamber 9 which normally opens from the opposite end of the member 7 providing the body or housing of the buffer. Reciprocable within the working chamber in relative sliding relation with the cylinder wall is a piston 10 which has an annular series of spaced axially oriented bolt holes 11 through which extend the shanks of bolts 12 and secure the piston coaxially onto the inner end of a piston rod 13 which has its outer end normally projecting beyond the rear end of the housing 7 and providing the opposite end of the buffer engageable with the other of the relatively movable members between which the buffer is mounted. Reciprocal guide for the piston rod 13 is afforded by an end closure flange 14 secured in closing relation to the open end of the cylinder housing 7 and carrying a rod-engaging bearing sleeve 15 and a dynamic rod seal 17.

Normally the piston rod 13 is maintained in extended position relative to the housing 7 and with the piston 10 engaging the end of the flange 14 as a limit stop, a coiled compression spring 18 seated at one end in the blind end of a central replenishing chamber 19 which opens at its opposite end toward the piston 10 concentric with a rearwardly opening counterbore 20 in the piston 10 coaxially aligned with a metering orifice 21 through which extends a tapered metering pin 22 mounted at its larger diameter butt end on the enclosure 8. At its smaller end, the metering pin 22 extends into the open end of the hollow piston rod chamber 19 and is engaged by a thrust and replenishing piston 23 which is slidably reciprocably mounted in the replenishing bore 19 and is thrust normally forwardly therein by the spring 18. Normally, the working cylinder chamber 9 and the replenishing chamber forwardly of the replenishing piston 23 are filled with hydraulic fluid, and the piston rod or chamber 19 behind the replenishing piston 23 has only air therein.

During inward compresion stroke of the piston 10 hydraulic fluid meters through the port 21 past the metering pin 22 with increasingly greater resistance as the effective flow area of the port is progressively reduced during progression of the working stroke. From the chamber 20, the piston displacement of fluid during the in-stroke of the piston is through lateral passages 24 communicating with respective ports 25 opening through the rear face of the piston. Leakage past the piston between its perimeter and the cylinder wall is substantially precluded by a high pressure piston ring 26 seated in the perimeter adjacent to the head end of the piston. To facilitate rapid return of the piston a plurality, herein six, return passages 27 open from the lateral passages 24 through check valve seats facing forwardly and closed by ball check valves 29 during the in or compression stroke and from which the check valves are displaced during the return stroke within a range permitted by a retainer ring disk 30 held in place by the screws 12. Through this arrangement, the damper 5 may be used in any attitude between horizontal and vertical.

According to the present invention, a small portion of the hydraulic fluid displaced from the front or head end of the piston 10 during a buffing or compressing stroke is utilized to promote centering of the piston. For this purpose, the perimeter of the piston spaced a limited distance rearwardly from the piston ring 26 and spaced a limited distance forwardly from the rear end of the piston, is provided with circumferentially equally spaced shallow centering pockets 31 of such number as will adequately serve the purpose in respect to the diameter of the piston. In this instance six of the pockets 31 are employed, although three might suffice. In this instance the pockets are circumferentially elongated with their adjacent ends spaced apart about half the length of the pockets. Each of the pockets 31 is in continuous communication with the front or high pressure side of the piston 10 through a respective communication port or passage 32 which bypasses the valve 29 by opening into the clearance forwardly from one of the narrow seats 28. Through this arrangement, any lateral or eccentric loading of the piston or of the cylinder housing 7 is counteracted. The pressure in the centering pocket or pockets 31 in that peripheral area of the piston which tends to press toward the cylinder wall acts to push the piston away from the wall. Diametrically opposite to such area of the piston, where, due to the sideward thrust toward such area, a gap tends to develop between the piston periphery and the cylinder wall, the pressure fluid tends to leak out of the balancing pocket or pockets 31 toward the low pressure or rear side of the piston, with a consequent pressure drop across the orifice defined by the respective passage leading to the pocket or pockets experiencing leakout. As a result the pressure in the pocket or pockets at the side thrust area acts to push the piston away from the cylinder wall until a substantially balanced pressure condition is resumed throughout the piston-balancing system and thereby maintain the piston in a substantially centered relation within the cylinder. The higher the buffer force, the higher the pressure that is generated, and the greater is the centering action which results. Therefore, irrespective of the force active on the buffer, the piston always is maintained substantially centered by the automatic, self-regulating hydrodynamic system.

In FIGURE 4 a modified buffer 35 is exemplified which is especially constructed and arranged for upright installation, using gravity replenishing. It includes a cylinder housing 37 having an integral end closure 38 at one end and defining a cylindrical working chamber 39 therein. Relatively reciprocably operable slidably therein is a working piston 40 constructed as the head end of an elongated hollow member including an integral piston rod portion 41 which projects normally outwardly beyond the open end of the body cylinder 37 and is of slightly smaller diameter than the cylinder head portion 40 whereby to define an axially outwardly facing stop shoulder 42 opposing a stop ring 43 secured to the open end portion of the housing cylinder 37 as by means of screws 44.

Normally the piston is biased toward extended position with the shoulder 42 backed against the stop ring 43 as by the action of a coiled compression spring 45 extending longitudinally centered within a chamber 47 defined within the piston and piston rod, with the upper end of the spring thrusting against an end closure 48 which has a central filler opening closed by a plug 49. At its opposite, lower end, the spring 45 thrusts against a flange member 50 which is seated on the upper end of a metering tube 51 opening upwardly through the flange and seated at its lower end on the housing enclosure 38.

Along its length, the metering tube 51 has orifices 52 through which hydraulic fluid is displaced during buffing or compression strokes of the piston 40 under progressive resistance into the tube and upwardly into the chamber 47 serving as a displacement reservoir largely gas-filled, such as with air, for this purpose. For convenience in construction, the piston 40 is provided in the head portion thereof with a separately formed head ring 53 which closely slidably engages the outer perimeter of the metering tube 51 and is fixedly secured to the piston portion 40 as by means of welding 54. During the in or buffer stroke of the piston one or more check valves such as balls 55 close respective orifices 57 through the piston ring 53 during return strokes of the piston, the head valves 55 open for relatively free return flow of hydraulic fluid from the displacement and replenishing reservoir chamber 47, being held against dropping too far from their seats by respective pins 58.

Leakage past the piston 40 during buffing strokes is substantially prevented by high pressure seal such as a piston ring 59 in its perimeter adjacent its head end and engaging the working chamber cylinder wall. Additional protection against fluid leakage past the piston 40 is afforded by a sealing structure such as an O-ring 60 mounted in the perimeter of the piston adjacent its stop shoulder 42 and engaging the cylinder wall.

Hydrodynamic piston centering means are provided for the buffer 35 similarly as in the buffer 5. Because the piston 40 is of greater length than the piston 10 a plurality of axially spaced circumferential rows of balancing pockets 61 are provided in the perimeter of the piston 40. High pressure communication with the working chamber 39 is effected with the piston-centering pockets 61 through respective longitudinally extending blind end communication bores 62 in the piston opening through its head end and with respective orifice passages 63 leading from the communication passage bores 62 into the respective pockets 61, desirably adjacent to the boundaries thereof nearest the pressure or head end of the piston, similarly as the orifices 32 of the buffer 5 so as to afford the most efficient pressure distribution. Functioning of the center pockets 61 to provide hydraulic pressure pad zones between the piston perimeter and the cylinder wall in eccentric force areas, with diametrically oppositely leakage from the respective pockets 61 and resultant pressure drop across the supply orifices 63 therefor, results in a centering, balancing of the piston and freedom from galling. Any of the hydraulic pressure fluid that may leak past the respective annular tiers or series of the centering pockets 61 is drained off into the reservoir chamber 47 through respective annular collecting grooves 64 in the outer perimeter of the piston 40 spaced adjacently rearwardly from the pockets and having one or more drain ports 65 leading therefrom into the reservoir.

It will be understood that variations and modifications may be effected without departing from the spirit and scope of a novel concept of this invention.

I claim as my invention:

1. A hydraulic buffer including a housing affording one end of the buffer and having therein a working chamber defining a cylindrical wall slidably opposed by a cylindrical perimeter of a piston reciprocably operative in the chamber and provided with a rod extending from the housing to afford the opposite end of the buffer; relative movement of the housing and the piston in one axial direction placing hydraulic liquid in said working chamber on one end of the piston under substantial pressure, hydrodynamic piston centering bearing means including circumferentially spaced pockets in said perimeter spaced from said pressure end of the piston and with a continuous intervening cylindrical portion of said perimeter between said pockets and said end, and means defining communication passages through said piston between said pressure end and said pockets and bypassing said intervening perimeter portion.

2. A hydraulic buffer as defined in claim 1, including annular high pressure sealing means in said continuous intervening cylindrical portion of said piston perimeter.

3. A hydraulic buffer as defined in claim 2, in which said communication passages include respective orifices effecting pressure drop in the associated pockets upon leakage of pressure fluid from such pockets.

4. A hydraulic buffer as defined in claim 1, in which said communication passages have respective orifices effecting pressure drop in the associated pockets on leakage of pressure fluid from the pockets.

5. A hydraulic buffer as defined in claim 1, in which there are at least three of said pockets equally circumferentially spaced around said perimeter.

6. A hydraulic buffer as defined in claim 1, in which said pockets are in a plurality of axially spaced circumferential series in said perimeter.

7. In combination in a hydraulic device of the character described including:

a housing having therein a working chamber defining a cylindrical wall, a piston reciprocably operable in said chamber and having a cylindrical perimeter slidably opposing said cylindrical wall, one end of said piston being operable to place hydraulic liquid in said working chamber under substantial pressure in a working stroke, and hydrodynamic piston centering bearing means providing hydraulic pressure pad zones at spaced intervals circumferentially about said perimeter and communicating with the hydraulic pressure at said end of the piston.

8. In a hydraulic device of the character described:

means defining a working chamber having a cylindrical wall, a piston reciprocably operable in said working chamber and having an end to place hydraulic liquid in the working chamber under substantial pressure in a working stroke of the piston, a circumferential series of equally spaced hydrodynamic piston centering bearing pockets in said perimeter, and passage means communicating said pockets with high pressure hydraulic fluid at said one end.

9. A hydraulic device as defined in claim 8, in which said passage means communicate with said pockets in those portions of the pockets nearest said one end of the piston.

10. In combination in a hydraulic buffer providing opposite ends to be disposed in respective pressure opposition to members movable toward one another:

a housing providing a head end to oppose one of the members and having therein a working chamber defined by a cylindrical wall opening in the opposite direction from said head end, a piston reciprocably disposed in said working chamber and having a perimeter slidably opposing said cylindrical wall, a piston rod extending from the piston outwardly substantially beyond said open end and affording the opposite end of the buffer to oppose the remaining of said members.

said piston having a head end operable to place hydraulic liquid in said working chamber under substantial pressure when said opposite ends are relatively driven toward one another by said members, means for metering hydraulic liquid through said piston from said head, and hydrodynamic piston centering bearing means in the perimeter of said piston comprising means defining hydraulic pressure pad zones about said perimeter communicating with the hydraulic pressure directly through said piston head.

11. A hydraulic buffer as defined in claim 10, in which said housing has means cooperating with the piston rod to define a displacement area back of the piston communicating with said metering means, and said pressure pad zones are adapted to leak toward the back of the piston into said area.

12. A hydraulic buffer as defined in claim 10, in which said piston rod is hollow and defines a replenishing and displacement chamber, said metering means communicates with said piston rod chamber, and said piston has drain off means from said perimeter leading into said piston rod chamber for hydraulic liquid leaking from said pressure pad zones.

No references cited.

ARTHUR L. LA POINT, *Primary Examiner.*

R. M. WOHLFARTH, *Assistant Examiner.*